US012041371B2

United States Patent
Ono et al.

(10) Patent No.: US 12,041,371 B2
(45) Date of Patent: Jul. 16, 2024

(54) SYNCHRONOUS CONTROL DEVICE, SYNCHRONOUS CONTROL METHOD, AND SYNCHRONOUS CONTROL PROGRAM

(71) Applicant: Nippon Telegraph and Telephone Corporation, Tokyo (JP)

(72) Inventors: Masato Ono, Musashino (JP); Takahide Hoshide, Musashino (JP); Yasushi Matsubara, Musashino (JP); Shinji Fukatsu, Musashino (JP); Kenichi Minami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 155 days.

(21) Appl. No.: 17/611,340

(22) PCT Filed: May 15, 2020

(86) PCT No.: PCT/JP2020/019464
§ 371 (c)(1),
(2) Date: Nov. 15, 2021

(87) PCT Pub. No.: WO2020/241308
PCT Pub. Date: Dec. 3, 2020

(65) Prior Publication Data
US 2022/0210295 A1 Jun. 30, 2022

(30) Foreign Application Priority Data

May 31, 2019 (JP) .................. 2019-102905

(51) Int. Cl.
*H04N 5/04* (2006.01)
*H04N 5/91* (2006.01)
(52) U.S. Cl.
CPC ............... *H04N 5/04* (2013.01); *H04N 5/91* (2013.01)

(58) Field of Classification Search
CPC .......... H04N 7/18; H04N 7/181; H04N 21/47; H04N 21/2343; H04N 21/23439;
(Continued)

(56) References Cited

U.S. PATENT DOCUMENTS

2013/0117692 A1* 5/2013 Padmanabhan ...... G06V 40/172
715/753
2016/0019935 A1* 1/2016 Adam .................... H04N 7/181
386/223
(Continued)

FOREIGN PATENT DOCUMENTS

| CN | 103702013 | 4/2014 |
| CN | 105430537 | 3/2016 |
| JP | 2017212515 | 11/2017 |

OTHER PUBLICATIONS

Association of Radio Industries and Businesses, "MMT-Based Media Transport Scheme in Digital Broadcasting Systems," ARIB Standard, Oct. 11, 2018, STD-B60 Version 1.13, 560 pages.

*Primary Examiner* — Michael E Teitelbaum
(74) *Attorney, Agent, or Firm* — Fish & Richardson P.C.

(57) ABSTRACT

To more reliably control synchronous between pieces of video/audio data from a plurality of imaging system devices. A synchronous control unit 15 that synchronizes a plurality of pieces of video/audio data transmitted individually from a plurality of imaging system devices 2 includes a frame acquisition unit 151 configured to acquire a plurality of pieces of frame data from the pieces of video/audio data and assign a frame timestamp based on an acquisition time to each of the plurality of pieces of frame data, for each of the pieces of the video/audio data, and a frame shaping unit 152 configured to assign a new frame timestamp to the plurality of pieces of frame data based on a value of the frame timestamp so that start times of the plurality of pieces of frame data that are close in time among the plurality of (Continued)

pieces of video/audio data are equal to each other, and time intervals between the plurality of pieces of frame data are equal to each other.

6 Claims, 8 Drawing Sheets

(58) Field of Classification Search
CPC .. H04N 21/2365; H04N 21/85; H04N 21/854; H04N 21/8547; H04N 21/8549; H04N 5/04; H04N 5/91; H04N 21/21805; H04N 21/236; H04N 21/242; H04N 21/64322
See application file for complete search history.

(56) References Cited

U.S. PATENT DOCUMENTS

| 2017/0332131 | A1* | 11/2017 | Opsenica | H04L 43/04 |
| 2018/0139260 | A1* | 5/2018 | Houle | H04L 65/61 |
| 2018/0192086 | A1* | 7/2018 | Henaire | H04N 21/23424 |

* cited by examiner

SYNCHRONOUS CONTROL DEVICE, SYNCHRONOUS CONTROL METHOD, AND SYNCHRONOUS CONTROL PROGRAM

CROSS-REFERENCE TO RELATED APPLICATIONS

This application is a National Stage application under 35 U.S.C. § 371 of International Application No. PCT/JP2020/019464, having an International Filing Date of May 15, 2020, which claims priority to Japanese Application Serial No. 2019-102905, filed on May 31, 2019. The disclosure of the prior application is considered part of the disclosure of this application, and is incorporated in its entirety into this application.

TECHNICAL FIELD

The present disclosure relates to a technology for controlling synchronous of video/audio data.

BACKGROUND ART

In the enterprise field, there is a trend of integrating a plurality of monitoring locations, and the demand for a remote video monitoring technology for monitoring videos of the plurality of monitoring locations at a remote location is increasing. For example, there is a demand for a remote video monitoring system that implements air traffic control that can monitor a plurality of airports at one location, public space monitoring that can collectively monitor airport lobbies, stations, and stadiums, and disaster prevention monitoring that can remotely monitor debris flows, tsunamis, and dams.

The remote video monitoring system has a function to transmit a high-definition and wide-viewing-angle video to the monitoring side in real time in order to not only monitor a plurality of monitoring locations in an integrated manner, but also to effectively grasp the status of the wide monitoring area of each monitoring location, for example, rapidly achieve strengthening of anti-terrorism measures and prevention of large-scale natural disasters.

For example, a remote video monitoring apparatus on the location side receives a plurality of individual camera videos (video/audio data) from a plurality of imaging system devices, and combines the plurality of pieces of received video/audio data. Then, the remote video monitoring apparatus synchronously transmits, to a remote video monitoring apparatus on the monitoring side, video/audio data of a panoramic video obtained by the combination and object information detected from the video data, by using an MPEG media transport (MMT) protocol via an IP network. In the transmission section of the IP network, a network time protocol (NTP) is used. Thus, it is possible to ensure synchronous control between the video/audio data and the object information (Non Patent Literature 1).

CITATION LIST

Non Patent Literature

Non Patent Literature 1: "MMT-Based Media Transport Scheme in Digital Broadcasting Systems", Standard, ARIB STD-B60, 1.13 Edition, Association of Radio Industries and Businesses, October 2018

SUMMARY OF THE INVENTION

Technical Problem

However, there is a problem in that it is difficult to completely control synchronous of a plurality of pieces of video/audio data received from each of a plurality of imaging system devices between the imaging system devices and the remote video monitoring apparatus on the location side.

The plurality of imaging system devices have differences, for example, a delay or jitter in imaging processing, and a case where predetermined video processing is performed after image pick-up. Even in the remote video monitoring apparatus on the location side, a plurality of collection devices (collection boards) in the remote video monitoring apparatus, that receive each piece of video/audio data have a difference such as fluctuation in an internal time.

Figure 8:
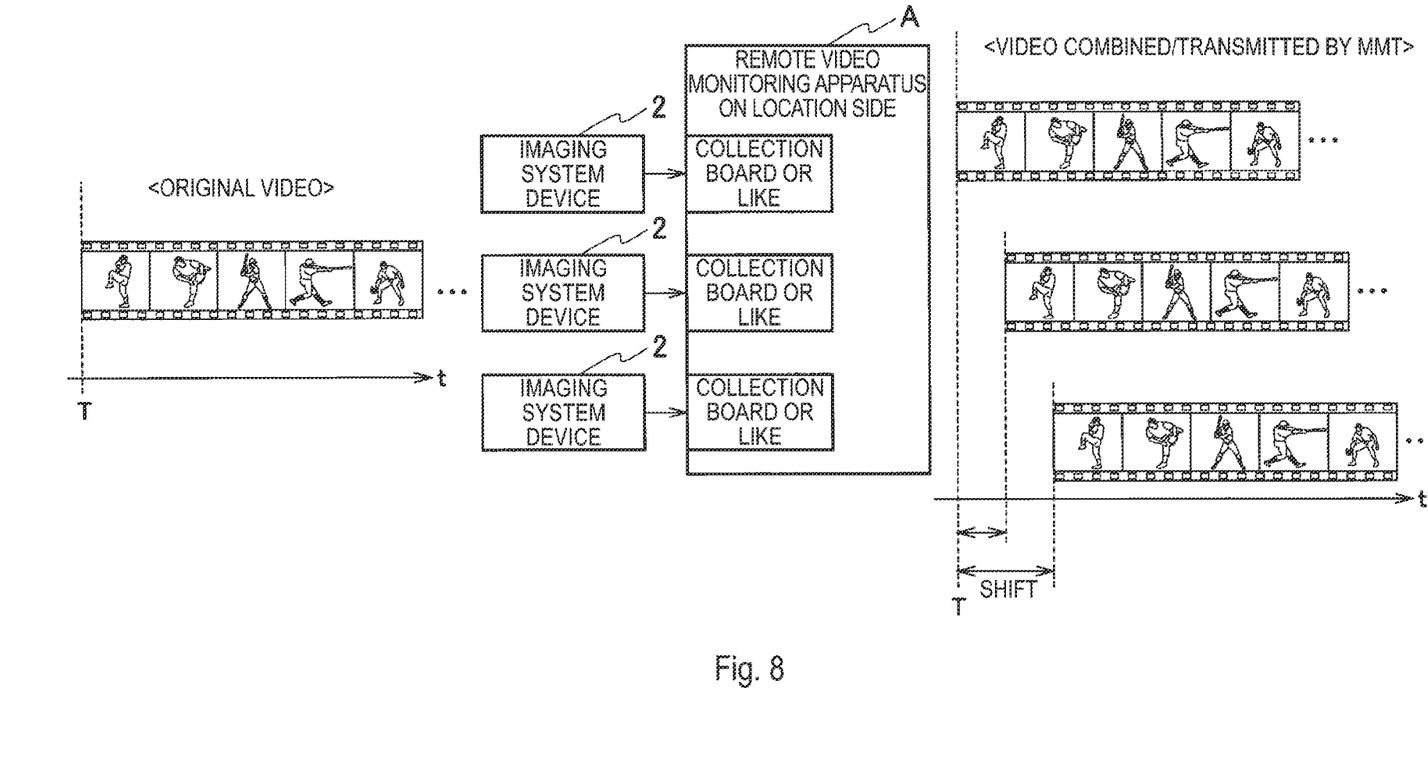
FIG. 8 is a diagram illustrating an image of a problem.

Thus, as illustrated in FIG. 8, even when the same video is picked up by a plurality of individual imaging system devices 2, a frame timestamp assigned to each of the plurality of pieces of video/audio data may be shifted. Thus, a situation in which it is not possible to identify video/audio frames as combination targets occurs when a remote video monitoring apparatus A on the location side performs combination processing. In addition, a situation is occurred in which synchronous deviation occurs during reproduction of the video even if synchronous is ensured between the transmission sections in the IP network and presentation system devices (output boards) on the monitoring side.

Therefore, it is necessary to perform synchronous control between pieces of the video/audio data, but, in order to grasp the shift in the frame timestamp assigned to the video/audio data, typically, it is necessary to check the log of a collection system device and to check packet data of the MMT protocol, and very complicated processing is required. In addition, there is a possibility that the shift of the frame timestamp may not be constant depending on the situation (fluctuation in the internal time and the like) of the collection system device, and it is difficult to perfectly synchronize the shift.

The present disclosure has been made in view of the above circumstances, and an object of the present disclosure is to more reliably control synchronous between pieces of video/audio data from a plurality of imaging system devices.

Means for Solving the Problem

In order to solve the above problems, according to an aspect of the present disclosure, a synchronous control device configured to synchronize a plurality of pieces of data transmitted from a plurality of imaging system devices in which the data is video data, audio data, or video and audio data, the device includes a frame acquisition unit configured to acquire a plurality of pieces of frame data from each of the plurality of pieces of data and assign a frame timestamp based on an acquisition time to each of the plurality of pieces of frame data, for each of the plurality of pieces of data, and a frame shaping unit configured to assign a new frame timestamp to the plurality of pieces of frame data based on a value of the frame timestamp so that start times of a plurality of pieces of frame data that are close in time among the plurality of pieces of data are equal to each other, and time intervals between the plurality of pieces of frame data are equal to each other.

In the synchronous control device, the frame shaping unit sets a time counted at a frame time interval of data of the plurality of pieces of data starting from a predetermined reference time, as the new frame timestamp.

The synchronous control device further includes a missing frame detecting unit configured to, if missing of frame data of the plurality of pieces of frame data is detected, duplicate frame data next to the frame data that is missing, as the frame data that is missing and insert the frame data that is duplicated.

The synchronous control device further includes a surplus frame detecting unit configured to, if redundancy or surplus of frame data of the plurality of pieces of frame data is detected, delete the frame data that is redundant or surplus.

According to another aspect of the present disclosure, a synchronous control method performed by a synchronous control device configured to synchronize a plurality of pieces of data transmitted from a plurality of imaging system devices in which the data is video data, audio data, or video and audio data, the method includes acquiring a plurality of pieces of frame data from each of the plurality of pieces of data and assigning a frame timestamp based on an acquisition time to each of the plurality of pieces of frame data, for each of the plurality of pieces of data, and assigning a new frame timestamp to the plurality of pieces of frame data based on a value of the frame timestamp so that start times of a plurality of pieces of frame data that are close in time among the plurality of pieces of data are equal to each other, and time intervals between the plurality of pieces of frame data are equal to each other.

According to still another aspect of the present disclosure, there is provided a synchronous control program causing a computer to execute the synchronous control method described above.

Effects of the Invention

According to the present disclosure, it is possible to more reliably control synchronous between pieces of video/audio data from a plurality of imaging system devices.

DESCRIPTION OF EMBODIMENTS

Hereinafter, an embodiment of the present disclosure will be described with reference to the drawings.

In the present embodiment, in order to solve the above problems, a synchronous control device, a synchronous control method, and a synchronous control program (simply referred to as a "synchronous control device" below in this paragraph) are disclosed. In the present embodiment, an example in which the synchronous control device is applied to a remote video monitoring system will be described. The synchronous control device can also be applied to applications other than remote monitoring such as, for example, an information processing system used in public viewing in the entertainment field.

Remote Video Monitoring System

First, a remote video monitoring system according to the present embodiment will be described.

The remote video monitoring system is a system in which a remote video monitoring apparatus on a location side synchronously transmits video/audio data of a panoramic video obtained by combining a plurality of camera videos (video/audio data), and object information detected from video data to a remote video monitoring apparatus on a monitoring side via an IP network by using an MMT protocol. In a transmission section of the IP network, an NTP is used to achieve synchronous control of the video/audio data and the object information with low latency.

Figure 1:
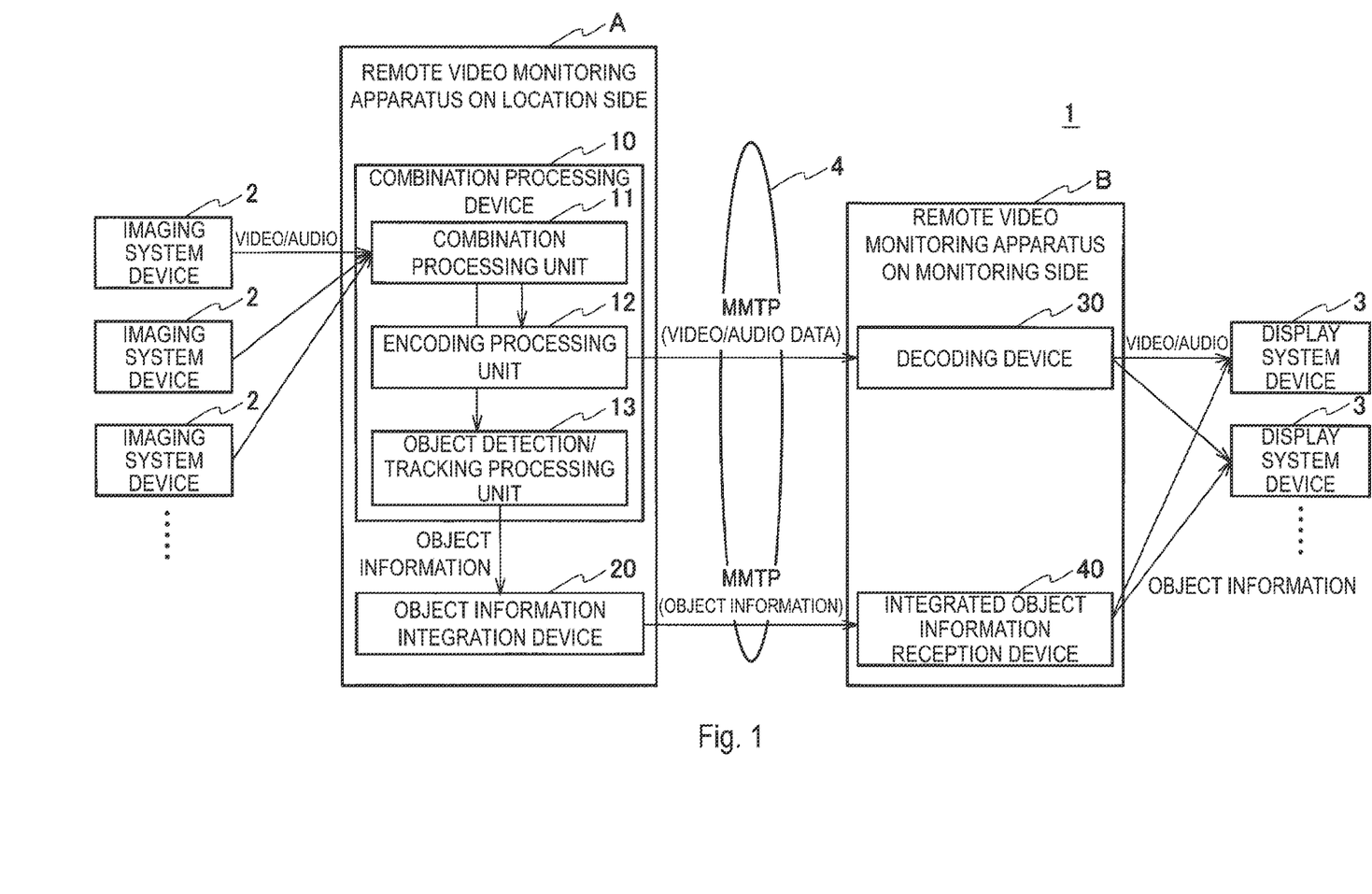
FIG. 1 is a diagram illustrating a configuration example of a remote video monitoring system.

FIG. 1 is a diagram illustrating a configuration example of a remote video monitoring system 1 according to the present embodiment. The remote video monitoring system 1 includes a remote video monitoring apparatus A on a location side, which is disposed on the location side, and a remote video monitoring apparatus B on a monitoring side, which is disposed on the monitoring side.

First, the remote video monitoring apparatus A on the location side will be described. As illustrated in FIG. 1, the remote video monitoring apparatus A on the location side includes, for example, a combination processing device 10 and an object information integration device 20.

The combination processing device 10 has a function of receiving a plurality of individual pieces of video/audio data from a plurality of imaging system devices 2 disposed on a location side, combining the plurality of pieces of received video data to generate a panoramic video, and detecting one or more objects from the received video data to perform tracking. Furthermore, the combination processing device 10 has a function of encoding video data and audio data of the generated panoramic video and transmitting video/audio data after the encoding processing to the remote video monitoring apparatus B on the monitoring side via an IP network 4 by using the MMT protocol. In order to perform the functions, as illustrated in FIG. 1, the combination processing device 10 includes, for example, a combination processing unit 11, an encoding processing unit 12, and an object detection/tracking processing unit 13.

The combination processing unit 11 receives an input of video/audio data having a size of, for example, 4 K in maximum from the plurality of imaging system devices 2 by the respective serial digital interface (SDI) interfaces, performs synchronous at the input timing, and combines a plurality of pieces of synchronized video data in real time. When combining the plurality of pieces of video data, in order to reduce an influence of disparity between the imaging system devices 2, the combination processing unit 11 dynamically changes the seam of each piece of video data synchronized between the plurality of pieces of video data and utilizes the tracking processing result obtained by tracking a predetermined object to improve combination quality.

The encoding processing unit 12 performs encoding processing on video/audio data of the panoramic video obtained by the combination, converts the data into MPEG media transport protocol (MMTP) packets receivable by a decoding device 30 constituting the remote video monitoring apparatus B on the monitoring side, and transmits the resultant of the conversion to the decoding device 30 via the IP network 4. For example, the encoding processing unit 12 encodes the input video uncompressed data with a high efficiency video coding (HEVC) codec or an advanced video coding (AVC) codec, encodes the input audio uncompressed data with an advanced audio coding (AAC) codec to convert the resultant of the encoding into a MMTP stream and transmit the MMTP stream. At this time, the encoding processing unit 12 ensures synchronous with the object information transmitted from the object information integration device 20 by managing the timecode of the MMTP stream.

The object detection/tracking processing unit 13 detects and tracks one or more objects from the plurality of pieces of video data, and transmits the result obtained by detecting and tracking the object to the object information integration device 20 by websocket as object information. A method of detecting and tracking an object can be achieved using a known technique.

The object information integration device 20 receives the object information from the object detection/tracking processing unit 13 by websocket, and converts coordinates of the object on a camera video included in the received object information into coordinates on a surround video. The object information integration device 20 integrates objects that simultaneously appear in the overlapping region into one object. The object information integration device 20 adds a predetermined linkage key to tracking information in the object information, queries a predetermined external server (not illustrated), and adds any additional information obtained to the tracking information. Then, the object information integration device 20 generates a signaling message from the tracking information. The object information integration device 20 converts the signaling message into MMTP packets to convert the signaling message into a MMTP stream, and transmits the MMTP stream to an integrated object information reception device 40 constituting the remote video monitoring apparatus B on the monitoring side, via the IP network 4 by using the MMT protocol.

Next, the remote video monitoring apparatus B on the monitoring side will be described. As illustrated in FIG. 1, the remote video monitoring apparatus B on the monitoring side includes, for example, a decoding device 30 and an integrated object information reception device 40.

The decoding device 30 receives the MMTP stream from the encoding processing unit 12 of the combination processing device 10 via the IP network 4. The decoding device 30 has functions of performing decoding processing on the video/audio data included in the MMTP packet in the received MMTP stream, performing synchronous control of the video/audio data decoded by decoding processing among a plurality of output devices (not illustrated), and outputting the video/audio data to a plurality of display system devices 3.

The integrated object information reception device 40 receives the MMTP stream from the object information integration device 20 via the IP network 4. The integrated object information reception device 40 acquires object information included in the MMTP packet in the received MMTP stream, converts the coordinates of an object in the object information into coordinates of each asset for identifying video/audio components, and outputs the coordinates to the plurality of display system devices 3. Details regarding the asset are disclosed in Non Patent Literature 1.

In the actual operation, an additional information superimposition device that superimposes video/audio data and object information is provided between the decoding device 30 and the integrated object information reception device 40, and the display system device 3. However, since the additional information superimposition device provides a function of superimposing data information, the additional information superimposition device can be mounted in any of the decoding device 30, the integrated object information reception device 40, and the display system device 3. The imaging system device 2 is, for example, a 4 K camera. The display system device 3 is, for example, a display, and the plurality of display system devices 3 is a multi-screen.

Combination Processing Device

The functions of the combination processing device 10 are as described above, but, in the present embodiment, the combination processing device 10 further includes a synchronous control unit (synchronous control device) in order to solve the problem that it is difficult to completely control synchronous between a plurality of pieces of video/audio data received individually from the plurality of imaging system devices 2.

Figure 2:
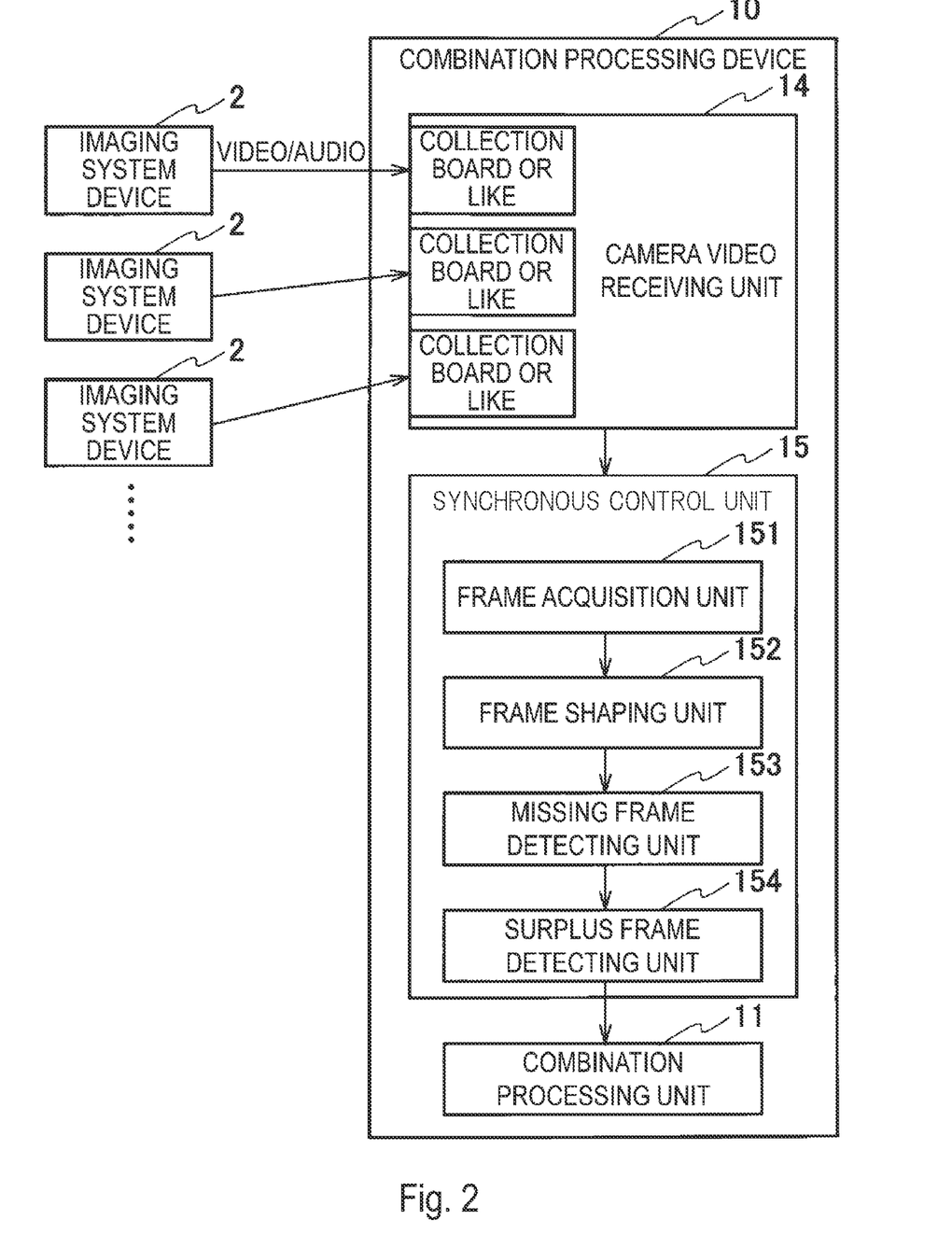
FIG. 2 is a diagram illustrating a configuration example of a combination processing device.

FIG. 2 is a diagram illustrating a configuration example of the combination processing device 10 that further includes the synchronous control unit. The combination processing device 10 performs control for improving synchronous accuracy between a plurality of pieces of video/audio data transmitted individually at approximately the same timing from the plurality of imaging system devices 2. For example, the combination processing device 10 includes a camera video receiving unit 14, a synchronous control unit 15, and a combination processing unit 11. In FIG. 2, the encoding processing unit 12 and the object detection/tracking processing unit 13 illustrated in FIG. 1 are omitted.

The camera video receiving unit 14 has a function of receiving a plurality of camera videos output from the plurality of imaging system devices 2 by a plurality of collection devices individually, and transmitting the plurality of pieces of received video/audio data individually to the synchronous control unit 15.

The synchronous control unit 15 functions between the camera video receiving unit 14 and the combination processing unit 11, and has functions of performing synchronous control on the plurality of pieces of video/audio data transmitted from the camera video receiving unit 14, and transmitting the plurality of pieces of video/audio data after the synchronous control individually to the combination processing unit 11. To perform this function, as illustrated in FIG. 2, the synchronous control unit 15 includes a frame acquisition unit 151, a frame shaping unit 152, a missing frame detecting unit 153, and a surplus frame detecting unit 154.

The frame acquisition unit 151 has functions of acquiring a plurality of pieces of frame data from the video/audio data for each piece of video/audio data, and assigning a frame timestamp based on the acquisition time to each of the plurality of pieces of frame data.

The frame shaping unit 152 has a function of assigning new frame timestamps to a plurality of pieces of frame data based on the values of the assigned frame timestamps so that start times of the plurality of pieces of frame data that are close in time among the plurality of pieces of video/audio data are equal to each other, and time intervals between the plurality of pieces of frame data are equal to each other.

The missing frame detecting unit 153 has functions of determining whether there is missing frame data for a plurality of pieces of video/audio data, and, duplicating next frame data of the missing frame data as the missing frame data and inserting the duplicated data into a missing position, if missing of the frame data is detected.

The surplus frame detecting unit 154 has functions of determining whether there is redundant or surplus frame data among a plurality of pieces of video/audio data, and deleting the redundant or surplus frame data, if the redundant or surplus frame data is detected.

The functions of the combination processing unit 11 are as described above. The synchronous control unit 15 can be implemented by a computer including a CPU, a memory, an input/output interface, a communication interface, and the like, similar to the combination processing device 10. It is also possible to create a synchronous control program causing a computer to function as the synchronous control unit 15, and a storage medium for the synchronous control program.

Synchronous Control Method

Figure 3:
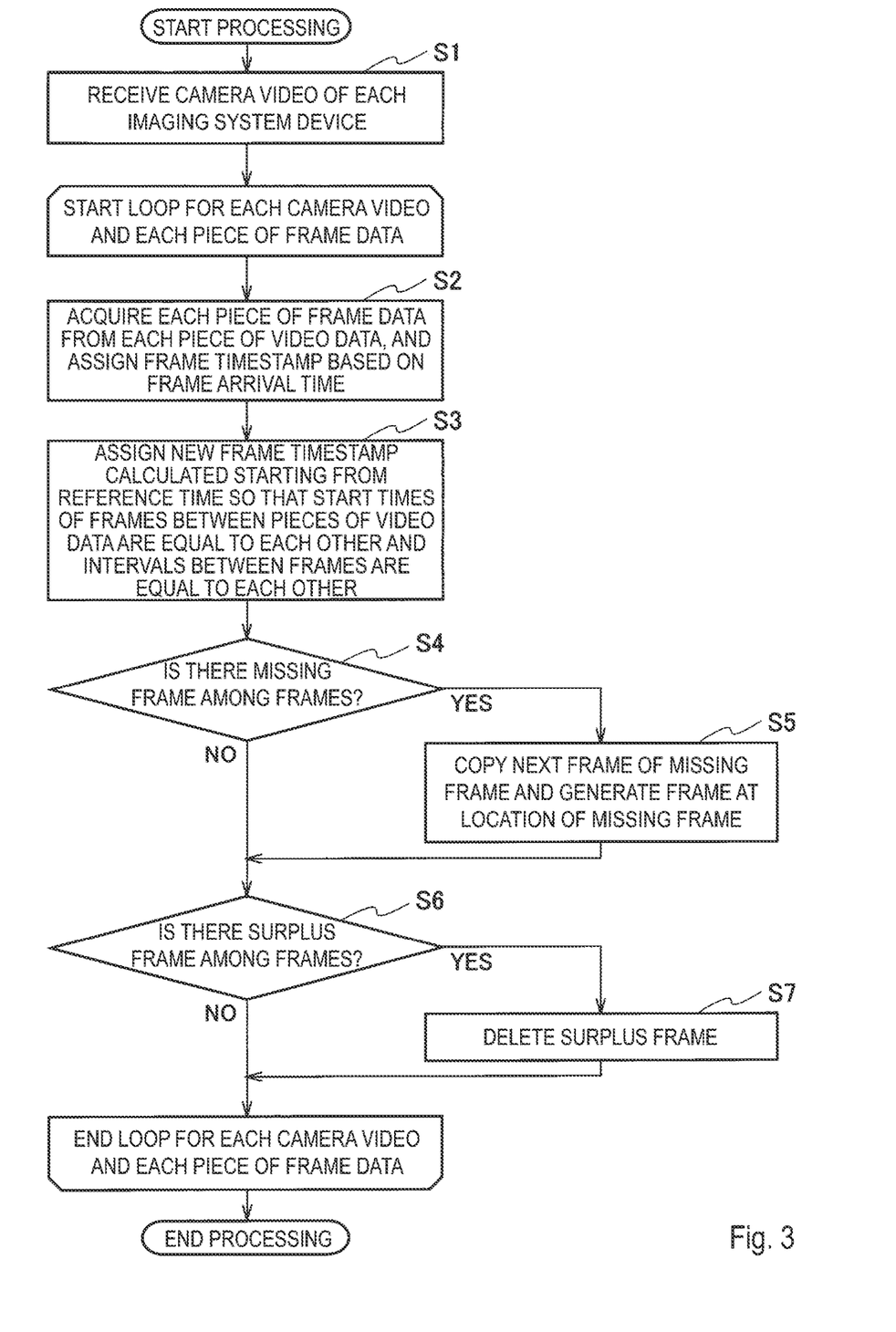
FIG. 3 is a diagram illustrating a synchronous control processing flow of video data.

Next, a synchronous control method for controlling synchronous among a plurality of camera videos will be described. In the synchronous control method, video data among video/audio data included in the camera video will be described as an example. Even in the case of audio data or video and audio data, the synchronous control method can be applied. FIG. 3 is a diagram illustrating a synchronous control processing flow of video data.

Step S1

Firstly, the camera video receiving unit 14 receives individually a plurality of pieces of video data respectively output at approximately the same timing from the corresponding plurality of imaging system devices 2, and transmits the plurality of pieces of received video data individually to the synchronous control unit 15. Then, the synchronous control unit 15 performs Steps S2 to S7 described below on each piece of frame data included in each piece of corresponding video data for the plurality of pieces of video data.

Step S2

Firstly, the frame acquisition unit 151 acquires each piece of frame data from each piece of the corresponding video data, and assigns a frame timestamp based on each acquisition time of each piece of the corresponding acquired frame data to each piece of frame data.

For example, in the case of a video having a frame rate 60 fps, the frame time interval is approximately 16.66 msec. Thus, if the frame acquisition unit acquires first frame data from a first camera at "2019/4/1/12:00.052" and acquires second frame data at "2019/4/1/12:00.070", the frame acquisition unit 151 assigns these acquisition times to the first frame data and the second frame data, respectively. The same is applied to frame data from other cameras.

Instead of the acquisition time of the frame data, the frame acquisition unit 151 may use a reception time or an arrival time of the frame data. The "acquisition time" described in Claims includes the reception time and the arrival time.

Step S3

Then, the frame shaping unit 152 assigns new frame timestamps to a plurality of pieces of frame data based on the values of the frame timestamps assigned in Step S2 in accordance with the frame rate of the video data so that start times of the plurality of pieces of frame data that are close in time among the plurality of pieces of video data are equal to each other, and time intervals between the plurality of pieces of frame data are equal to each other.

That is, the frame shaping unit 152 shapes the frame timestamp assigned based on the acquisition time or the arrival time of the frame data at equal intervals, in accordance with the frame rate. At this time, it is assumed that the new frame timestamp has a value calculated for each frame time interval starting from a predetermined reference time (1900/1/1/0:00.000=0 in the NTPv4 64-bit representation).

Thus, it is possible to assign the frame timestamps without the shift regardless of the plurality of imaging system devices 2.

Assignment Example 1 of New Frame Timestamp

For example, in the case of a video having a frame rate of 60 fps, the frame time interval is approximately 16.66 msec. In this case, firstly, the frame shaping unit 152 calculates, as described below, the time for each frame time interval at or after the current time ("2019/4/1/12:00.000"), which is calculated starting from the above described predetermined reference time. Here, exactly every second is represented as "0.000". The following examples of the times are values rounded off to three decimal places.

2019/4/1/12:00.000
2019/4/1/12:00.017
2019/4/1/12:00.033
2019/4/1/12:00.050
2019/4/1/12:00.067

When each arrival time of pieces of video data from three cameras starts at the following times:
first camera (first frame data): 2019/4/1/12:00.052,
second camera (first frame data): 2019/4/1/12:00.055,
and third camera (first frame data): 2019/4/1/12:00.056,
the frame shaping unit 152 selects "2019/4/1/12:00.050" which is the closest to each arrival time from the plurality of "times for each frame time interval" that have been calculated. Then, the frame shaping unit assigns the selected "2019/4/1/12:00.050" to each of the pieces of first frame data of each of all three pieces of video data.

Various methods are considered for the method of selecting the time. For example, for frame data received at the first time after frame processing is started, the frame shaping unit 152 compares the acquisition time of the frame data with the "time for each frame time interval" anterior and posterior to the acquisition time, and selects the closer time. If the acquisition time of the frame data is the center of the frame time interval, the frame shaping unit 152 selects the past time.

Then, the frame shaping unit 152 assigns the time for each frame time interval (approximately 16.66 msec) to frame data at or after the first frame data.

Thus, in the case of the above example, the frame timestamps described below are assigned to all the three pieces of video data, and thus synchronous between the three pieces of video data is completely controlled. "00:00.017" of the frame timestamps assigned below is a value obtained by rounding "16.66 msec"="00:00.01666" to three decimal places.

First Frame Data: 2019/4/1/12:00.050
Second Frame Data: 2019/4/1/12:00.050+00:00.017×1
Third Frame Data: 2019/4/1/12:00.050+00:00.017×2
n-th Frame Data: 2019/4/1/12:00.050+00:00.017×(n−1)

Assignment Example 2 of New Frame Timestamp

In Assignment Example 1, the method for assigning the time for each frame time interval to frame data other than the first frame data has been described. If there is missing frame data or surplus and redundant frame data, as in Assignment Example 1, in a case where the time for each frame time interval is uniformly assigned to frame data other than the first frame data, there is a possibility that the same frame timestamp is assigned to pieces of frame data which are completely different in time among the plurality of pieces of video data.

Therefore, for not only the first frame data, but also the frame data other than the first frame data, the acquisition time is compared with the "time for each frame time interval" and selected. As a result, a frame timestamp of the time that matches the acquisition time of the frame data is assigned. Thus, even if there is missing or redundant frame data, it is possible to reliably assign the correct frame timestamp.

Figure 4:
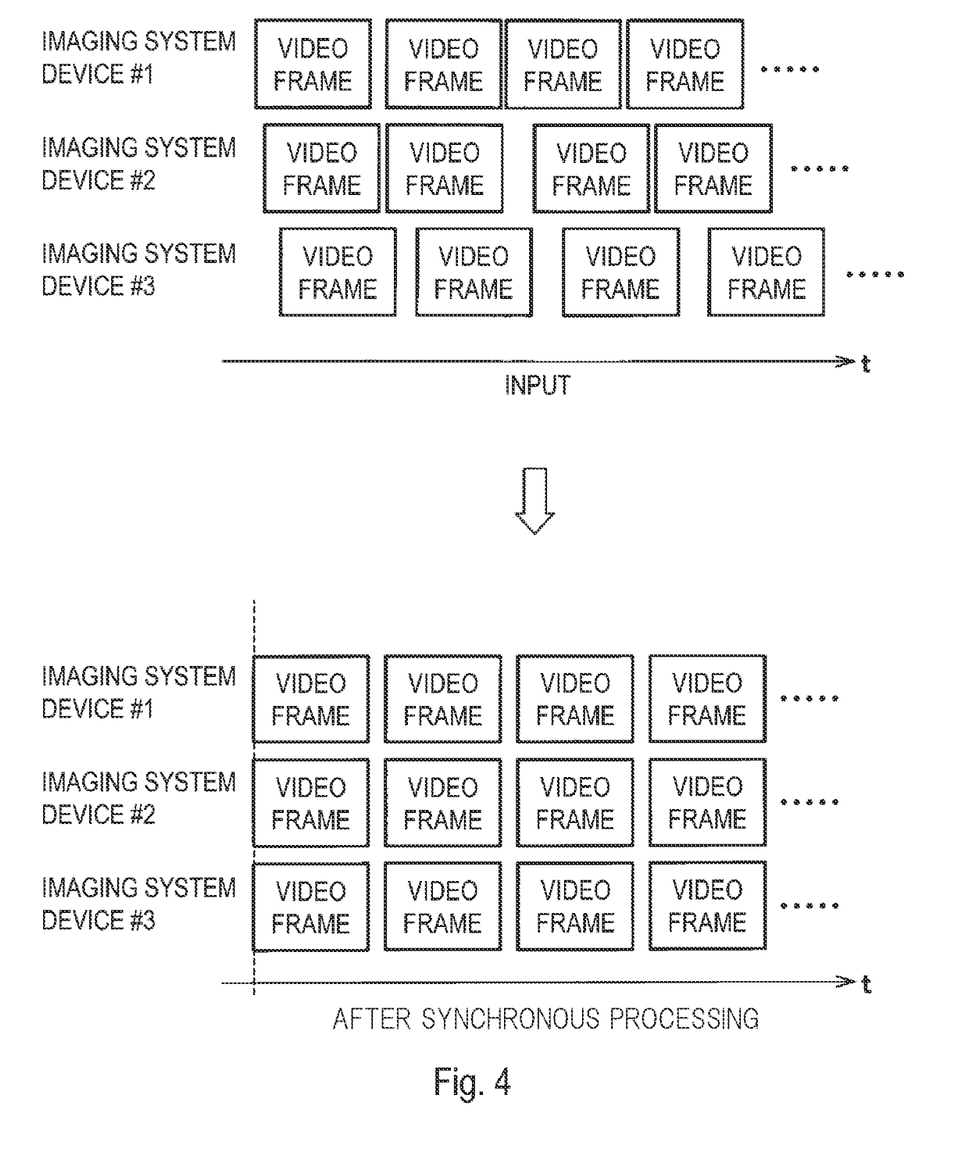
FIG. 4 is a diagram illustrating an image of frame data after synchronous processing.

By performing the processing operations of Steps S1 to S3 described above, it is possible to reliably control synchronous between individual camera videos from the plurality of imaging system devices 2, as illustrated in FIG. 4. As described above, depending on the imaging system device 2, there is a possibility that delay and jitter in image picking-up processing occur largely by the occasional situation and state, and missing frame data or surplus and redundant frame data may occur.

In Step S4 and the subsequent processing operations, the excess or deficiency of the frame data is checked, and the frame data is duplicated or deleted. Thus, even if the frame data has jitter or there is missing/surplus/redundant frame data, a state where frame timestamps for all camera videos are constantly synchronized is achieved.

Step S4

Then, the missing frame detecting unit 153 determines whether there is missing frame data among pieces of frame data related to each piece of video data. For example, the missing frame detecting unit 153 refers to the value of the new frame timestamp assigned in Step S3. If some frame timestamps corresponding to the times counted at the frame time intervals are omitted, the missing frame detecting unit 153 determines that there is missing frame data. If there is the missing frame data, the process proceeds to Step S5. Alternatively, if there is no missing frame data, the process proceeds to Step S6.

Step S5

Figure 5:
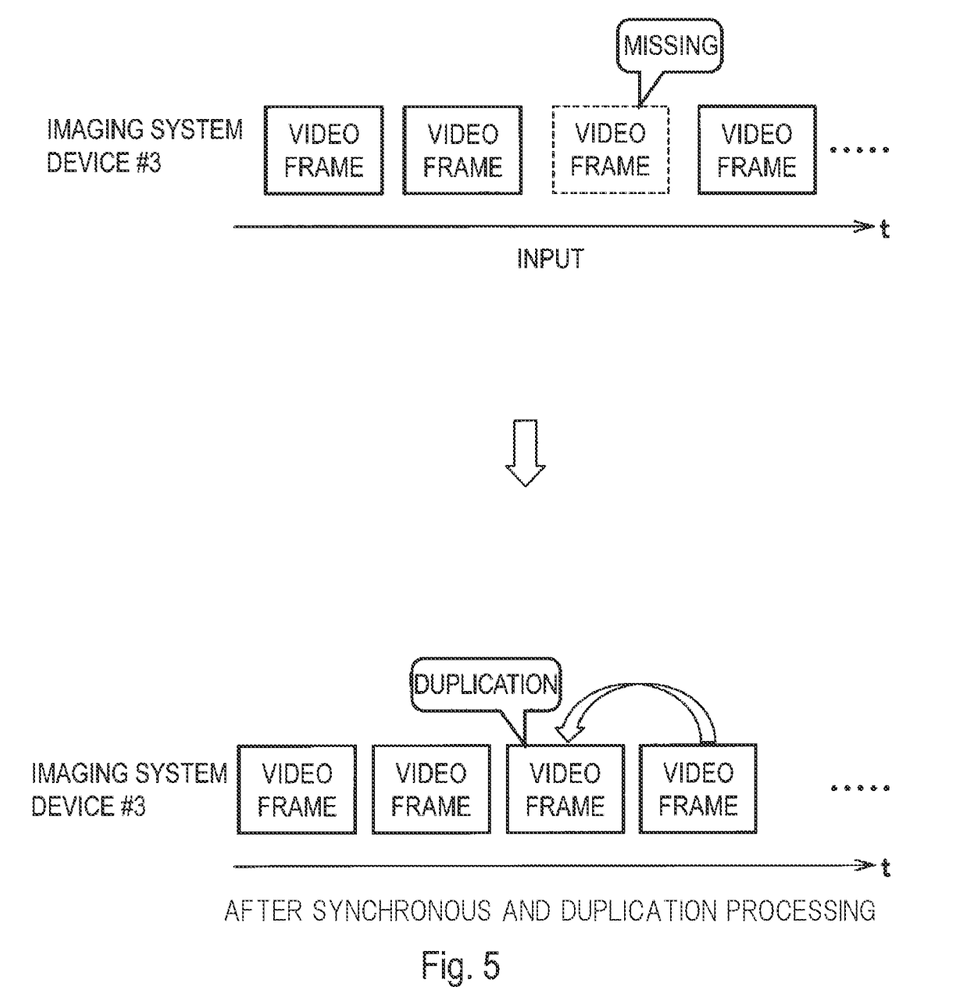
FIG. 5 is a diagram illustrating an image of frame data after synchronous and duplication processing.

When there is the missing frame data, the missing frame detecting unit 153 duplicates and inserts the next frame data of the missing frame data as the missing frame data, as illustrated in FIG. 5. That is, the missing frame detecting unit 153 performs repeat processing for duplicating the next frame of the missing frame and additionally inputting the duplicated frame when detecting missing of the frame. Then, the process proceeds to Step S6.

Step S6

Then, the surplus frame detecting unit 154 determines whether there is a redundant or surplus frame data among pieces of frame data. For example, the surplus frame detecting unit 154 refers to the value of the new frame timestamp assigned in Step S3. If the same frame timestamp is assigned to a plurality of pieces of frame data, the surplus frame detecting unit 154 determines that there is redundant or surplus frame data. If there is redundant or surplus frame data, the process proceeds to Step S7. Alternatively, if there is no redundant or surplus frame data, the process is ended.

Step S7

Figure 6:
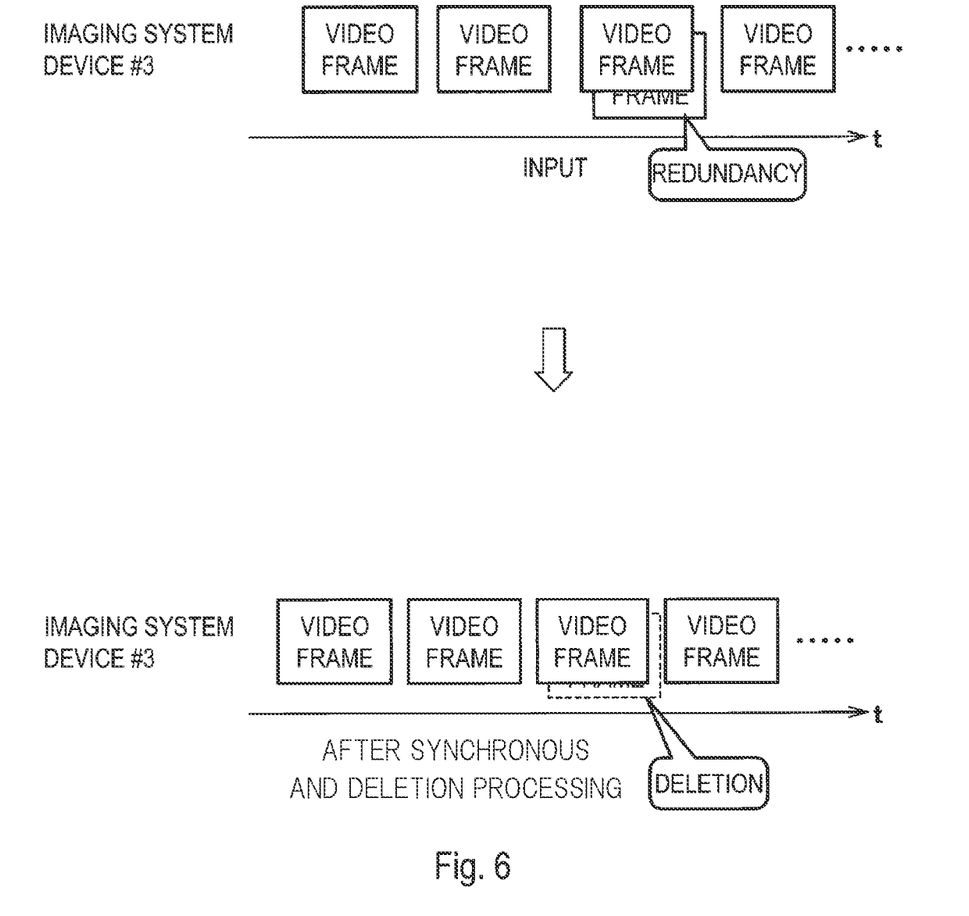
FIG. 6 is a diagram illustrating an image of frame data after synchronous and deletion processing.

If there is redundant or surplus frame data, the surplus frame detecting unit 154 deletes the redundant or surplus frame data as illustrated in FIG. 6. That is, the surplus frame detecting unit 154 performs skip processing of deleting the redundant or surplus frame when detecting the redundant or surplus frame. Then, the process is ended.

Finally, the method of assigning the frame timestamp will be summarized.

First, the frame acquisition unit 151 assigns the frame timestamp based on the acquisition time of frame data to each piece of frame data for a plurality of pieces of video data. The frame timestamp is illustrated by a white circle in FIG. 7, for example, due to the delay, jitter, and the like of the image picking-up processing.

Then, the frame shaping unit 152 calculates the time (hatched circle in FIG. 7) counted at the frame time interval (16.66 msec) from the current time ("2019/4/1/12:00.000") calculated starting from the reference time ("1900/1/1/0:00.000"), in accordance with the frame rate (60 fps) of video data. Then, the frame shaping unit 152 assigns the "time counted at the frame time interval" as a new frame timestamp, to each piece of frame data. That is, the frame shaping unit 152 performs processing of re-assigning the frame timestamp based on the acquisition time of the frame data to the time calculated starting from the reference time, in accordance with the frame rate.

Figure 7:
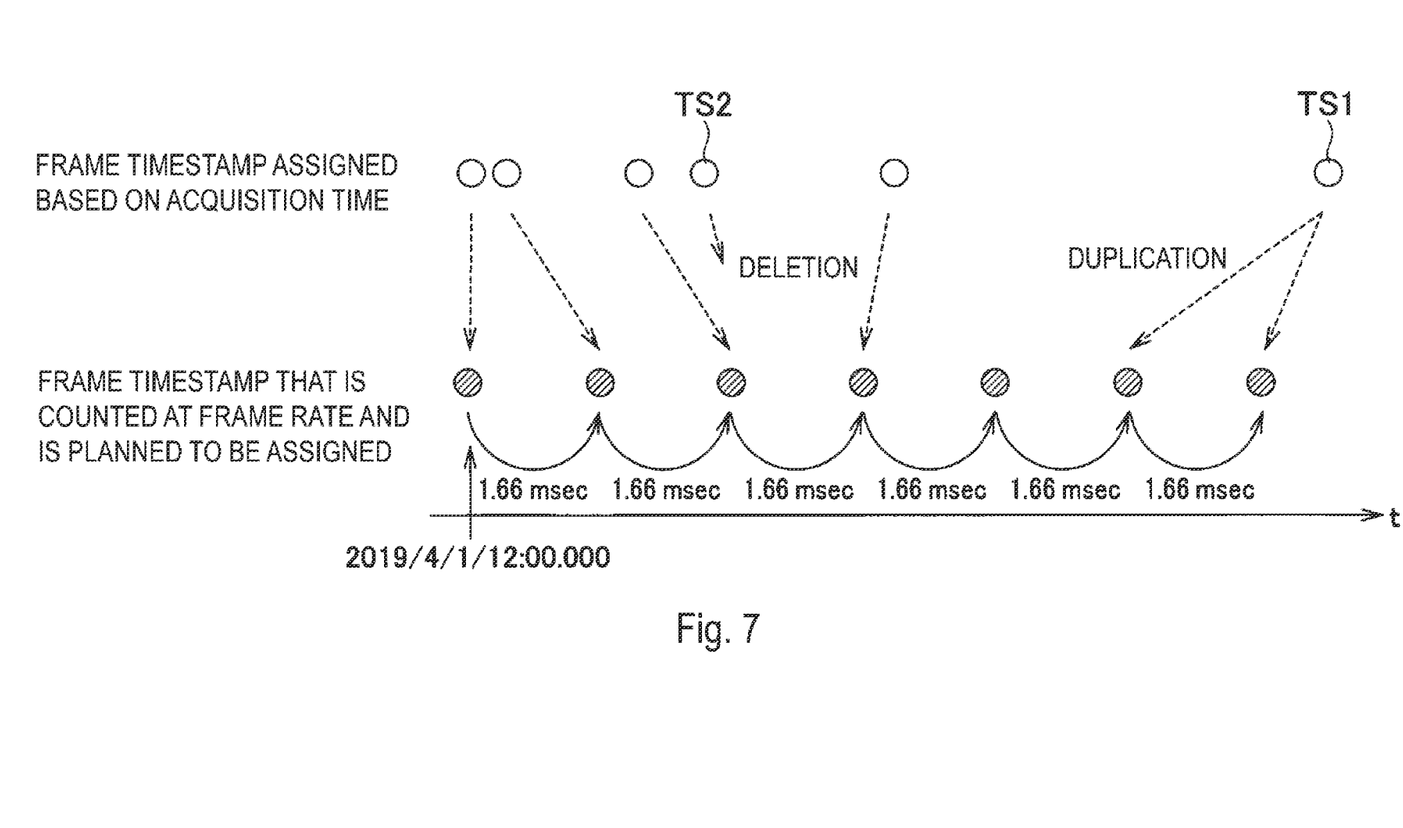
FIG. 7 is a diagram illustrating an assignment example of a frame timestamp.

At this time, if re-assignment has not been performed to two or more consecutive frame timestamps planned to be assigned in the past than the frame timestamp based on the acquisition time, as with a frame timestamp TS1 illustrated in FIG. 7, the repeat processing is performed on frame data up to one frame before. In addition, if re-assignment has been performed to a frame timestamp planned to be assigned in the future than the frame timestamp based on the acquisition time, as with a frame timestamp TS2, the skip processing is performed.

Effects of Embodiment

As described above, according to the present embodiment, the synchronous control unit 15 that synchronizes a plurality of pieces of video/audio data transmitted individually at approximately the same timing from a plurality of imaging system devices 2 includes the frame acquisition unit 151 configured to acquire a plurality of pieces of frame data from the pieces of video/audio data and assign a frame timestamp based on an acquisition time to each of the plurality of pieces of frame data, for each piece of the video/audio data, and the frame shaping unit 152 configured to assign a new frame timestamp to the plurality of pieces of frame data based on a value of the frame timestamp so that start times of a plurality of pieces of frame data that are close in time among the plurality of pieces of video/audio data are equal to each other, and time intervals among the plurality of pieces of frame data are equal to each other. Thus, it is possible to more reliably control synchronous among a plurality of pieces of video/audio data from the plurality of corresponding imaging system devices in a remote video monitoring system.

In addition, according to the present embodiment, since the frame shaping unit 152 sets the time counted at the frame time interval of video/audio data, calculated starting from 1900/1/1/0:00.000, as the new frame timestamp, it is possible to achieve assignment of the frame timestamp synchronized with the coordinated universal time (UTC) to all input video frames.

In addition, according to the present embodiment, the missing frame detecting unit 153 that duplicates and inserts the next frame data of a missing frame data as the missing frame data when detecting missing of a frame data is further provided. Thus, it is possible to further reliably control synchronous between a plurality of pieces of video/audio data.

In addition, according to the present embodiment, the surplus frame detecting unit 154 that deletes the redundant or surplus frame data when detecting the redundant or surplus frame data is further provided. Thus, it is possible to further reliably control synchronous among a plurality of pieces of video/audio data.

REFERENCE SIGNS LIST

1 Remote video monitoring system
2 Imaging system device
3 Display system device
4 IP network
10 Combination processing device
11 Combination processing unit
12 Encoding processing unit
13 Object detection/tracking processing unit
14 Camera video receiving unit
15 Synchronous control unit
151 Frame acquisition unit
152 Frame shaping unit
153 Missing frame detecting unit
154 Surplus frame detecting unit
20 Object information integration device
30 Decoding device
40 Integrated object information reception device
A Remote video monitoring apparatus on location side
B Remote video monitoring apparatus on monitoring side

The invention claimed is:

1. A synchronous control device configured to synchronize a plurality of pieces of data transmitted from a plurality of imaging system devices, wherein
the data comprises video data, audio data, or video and audio data, the synchronous control device comprising:
a frame acquisition unit, including one or more processors, configured to:
acquire a plurality of frame data from the plurality of pieces of data;
for each of the plurality of pieces of data: assign a frame timestamp based on an acquisition time of each frame data of the plurality of frame data for a piece of data; and
a frame shaping unit, including one or more processors, configured to:
generate, using a frame rate for each of the plurality of frame data, a series of times starting from a time when a first piece of data of the plurality of pieces of data is received;
for each of the plurality of pieces of data:
compare a frame timestamp of each of piece of data to each time in the series of times; and
select a time in the series of times based on the comparison satisfying a threshold proximity;
assign the selected time as a first frame timestamp to the plurality of frame data for each piece of data of the plurality of pieces of data, wherein the comparison is performed such that (i) start times of the plurality of frame data are within the threshold proximity to the times of the plurality of pieces of data and time intervals among the plurality of frame data are equal to each other;
and
adjust, for each frame data of the plurality of pieces of data, each frame timestamp according to the selected time and an index of the frame timestamp.

2. The synchronous control device according to claim 1, further comprising:
a missing frame detecting unit, including one or more processors, configured to:
detect a missing frame data of the plurality of frame data; and
in response to detecting the missing frame data of the plurality of frame data, duplicate frame data next to the frame data that is missing, as the frame data that is missing and insert the frame data that is duplicated.

3. The synchronous control device according to claim 1, further comprising:
a surplus frame detecting unit, including one or more processors, configured to:
detect a redundancy or surplus of frame data of the plurality of frame data; and
in response to detecting the redundancy or surplus of frame data of the plurality of frame data, delete the frame data that is redundant or in surplus.

4. A synchronous control method performed by a synchronous control device configured to synchronize a plurality of pieces of data transmitted from a plurality of imaging system devices, wherein
the data comprises video data, audio data, or video and audio data, the synchronous control method comprising:
acquiring a plurality of pieces of frame data from the plurality of pieces of data;
for each of the plurality of pieces of data: assigning a frame timestamp based on an acquisition time to each of the plurality of pieces of frame data, for each of the plurality of pieces of data;
generating, using a frame rate for each of the plurality of frame data, a series of times starting from a time when a first piece of data of the plurality of pieces of data is received;
for each of the plurality of pieces of data:
comparing a frame timestamp of each of piece of data to each time in the series of times; and
selecting a time in the series of times based on the comparison satisfying a threshold proximity;
assigning the selected time as a first frame timestamp to the plurality of frame data for each piece of data of the plurality of pieces of data, wherein the comparison is performed such that (i) start times of the plurality of frame data are within the threshold proximity to the times of the plurality of pieces of data and time intervals among the plurality of frame data are equal to each other;
and
adjusting, for each frame data of the plurality of pieces of data, each frame timestamp according to the selected time and an index of the frame timestamp.

5. A non-transitory recording medium storing a synchronous control program causing a computer to execute synchronous control method performed by a synchronous control device configured to synchronize a plurality of pieces of data transmitted from a plurality of imaging system devices, the data comprises video data, audio data, or video and audio data, wherein executing of the synchronous control program causes one or more computers to perform operations comprising:
acquiring a plurality of pieces of frame data from the plurality of pieces of data;
for each of the plurality of pieces of data: assigning a frame timestamp based on an acquisition time to each of the plurality of pieces of frame data, for each of the plurality of pieces of data;
generating, using a frame rate for each of the plurality of frame data, a series of times starting from a time when a first piece of data of the plurality of pieces of data is received;
for each of the plurality of pieces of data:

comparing a frame timestamp of each of piece of data to each time in the series of times; and selecting a time in the series of times based on the comparison satisfying a threshold proximity;

assigning the selected time as a first frame timestamp to the plurality of frame data for each piece of data of the plurality of pieces of data, wherein the comparison is performed such that (i) start times of the plurality of frame data are within the threshold proximity to the times of the plurality of pieces of data and time intervals among the plurality of frame data are equal to each other;

and adjusting, for each frame data of the plurality of pieces of data, each frame timestamp according to the selected time and an index of the frame timestamp.

6. The synchronous control device of claim 1, wherein each of the time intervals are an inverse of the frame rate.

* * * * *